US010836522B2

United States Patent
Bocks et al.

(10) Patent No.: US 10,836,522 B2
(45) Date of Patent: Nov. 17, 2020

(54) VACUUM DRAWER FOR VACUUMING FOOD

(71) Applicant: Michatek k.s., Michalovce (SK)

(72) Inventors: Stefan Bocks, Frasdorf (DE); Florian Harlander, Nlederndorf (AT)

(73) Assignee: Michatek k.s., Michalovce (SK)

( * ) Notice: Subject to any disclaimer, the term of this patent is extended or adjusted under 35 U.S.C. 154(b) by 883 days.

(21) Appl. No.: 15/293,895

(22) Filed: Oct. 14, 2016

(65) Prior Publication Data

US 2017/0107004 A1 Apr. 20, 2017

(30) Foreign Application Priority Data

Oct. 15, 2015 (DE) .......................... 10 2015 013 444

(51) Int. Cl.
| | | |
|---|---|---|
| *A47B 71/00* | (2006.01) | |
| *B65B 31/04* | (2006.01) | |
| *B65B 31/02* | (2006.01) | |
| *A47B 77/08* | (2006.01) | |
| *A47B 77/16* | (2006.01) | |
| *B65B 51/22* | (2006.01) | |
| *B65B 65/00* | (2006.01) | |

(52) U.S. Cl.
CPC ............ *B65B 31/024* (2013.01); *A47B 77/08* (2013.01); *A47B 77/16* (2013.01); *B65B 51/22* (2013.01); *B65B 65/00* (2013.01)

(58) Field of Classification Search
CPC ... F25D 17/042; F25D 25/025; F25D 317/043
USPC .......................................................... 62/268
See application file for complete search history.

(56) References Cited

U.S. PATENT DOCUMENTS

| | | | | |
|---|---|---|---|---|
| 4,349,434 A | * | 9/1982 | Jaworski ................ | B01D 35/18 210/149 |
| 5,095,717 A | * | 3/1992 | Germi .................... | F25D 17/042 417/313 |
| 5,157,940 A | * | 10/1992 | Bertu ..................... | F25D 17/042 62/268 |
| 5,734,999 A | * | 4/1998 | Nicholas ............... | E04H 4/1236 4/496 |
| 6,148,875 A | * | 11/2000 | Breen .................... | B65B 25/046 141/192 |
| 6,341,387 B1 | * | 1/2002 | Zars ......................... | E04H 4/12 4/504 |
| 6,944,893 B1 | * | 9/2005 | Mattson, Jr. ....... | A61H 33/0087 210/167.11 |
| 2005/0102975 A1 | | 5/2005 | Hughes et al. | |

(Continued)

FOREIGN PATENT DOCUMENTS

| | | |
|---|---|---|
| DE | 33 35 151 A1 | 4/1985 |
| DE | 10 2014 010 569 A1 | 1/2016 |
| EP | 405 680 A2 | 1/1991 |

(Continued)

*Primary Examiner* — Andrew M Tecco
*Assistant Examiner* — Eyamindae C Jallow
(74) *Attorney, Agent, or Firm* — Dilworth & Barrese, LLP

(57) ABSTRACT

A vacuum drawer for vacuuming food comprises a vacuum chamber (20) which can be closed in an airtight manner by a cover (21) which can be actuated and an installation unit (40) to which a vacuum pump can be connected. To be able to generate an external vacuum, the vacuum drawer comprises a connector part (41) which is releasably connectable to the installation unit (40) (FIG. 2).

12 Claims, 8 Drawing Sheets

(56) References Cited

U.S. PATENT DOCUMENTS

2007/0234690 A1\* 10/2007 Ryan ..................... A47L 5/38
                                                                             55/429
2017/0043892 A1\* 2/2017 Bocks ............... B29C 66/43121

FOREIGN PATENT DOCUMENTS

| EP | 2062823 A1 \* | 5/2009 | ............. B65B 31/02 |
| --- | --- | --- | --- |
| EP | 2 974 969 A1 | 1/2016 | |
| JP | 3484318 B2 | 10/2003 | |
| WO | 2004/065222 A1 | 8/2004 | |

\* cited by examiner

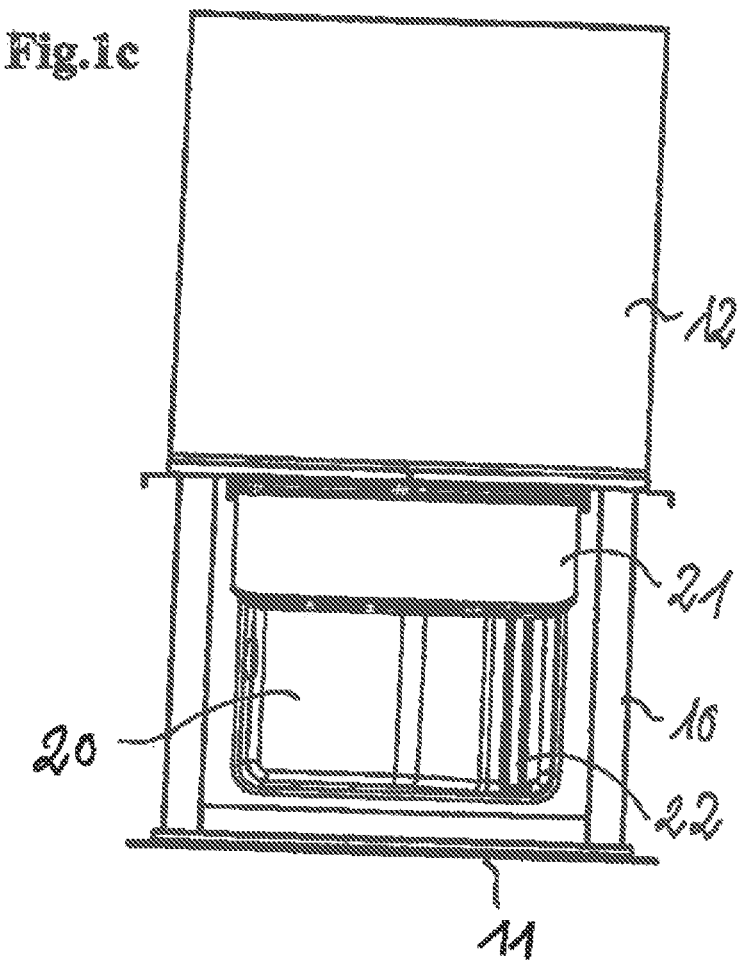
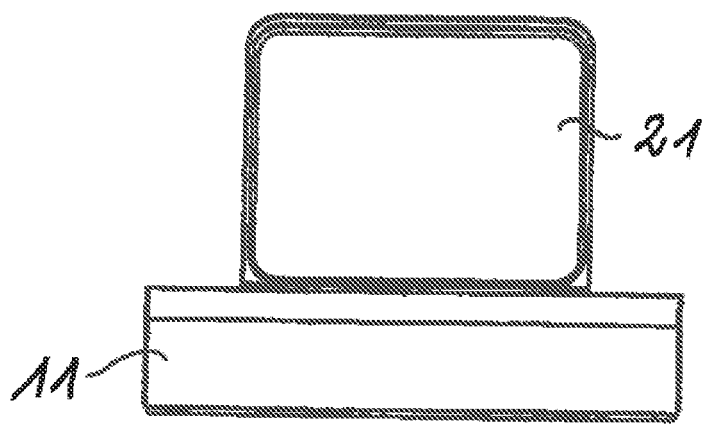

VACUUM DRAWER FOR VACUUMING FOOD

BACKGROUND OF THE INVENTION

The invention relates to a vacuum drawer for vacuuming food in accordance with the description herein. The vacuum drawer comprises a vacuum chamber which can be closed in an airtight manner by a cover which can be actuated and an installation unit to which a vacuum pump can be connected.

Vacuuming units comprise a vacuum chamber into which a suitable container, for example in the form of a sealable bag, is placed. A sealing bar which is vertically adjustable in the vertical direction extends within the chamber. The container filled with food is placed into the vacuum chamber, the latter subsequently being closed in an airtight manner via a cover to generate a chamber vacuum by means of a vacuum pump.

Since the sealing bar is first positioned in an open position, the air can also be sucked out of the container. The sealing bar is subsequently vertically adjusted and the bag is clamped between the sealing bar and the counterpart. The bag is sealed via the supplied welding energy.

A vacuum drawer is known from DE 10 2014 010 569 A1.

EP 0 405 680 A2 discloses a cooling device having a container which can be evacuated.

A film welding device for domestic purposes is known from DE 33 35 151 A1 which has a pump and an air passage having a liquid barrier.

JP 3 484 318 B2 discloses a further vacuuming device.

The vacuum in the vacuum chamber is generated by a vacuum pump which is located outside the vacuum chamber. The previously known solutions for connecting the vacuum pump to the vacuum chamber are worthy of improvement. There is in particular a need in specific cases not to generate a vacuum in the vacuum chamber, but rather at another point, that is to generate an external vacuum.

SUMMARY OF THE INVENTION

It is the object of the invention to provide a vacuum drawer of the initially specified kind for which an external vacuum can be generated in a simple manner.

This object is achieved in accordance with the invention by the features herein. The vacuum drawer for vacuuming food comprises a vacuum chamber which can be closed in an airtight manner by a cover which can be actuated. The cover can be partly or completely composed of glass. The vacuum drawer furthermore comprises an installation unit to which a vacuum pump can be connected. The installation unit is fastened to the vacuum chamber, in particular to a side wall of the vacuum chamber.

In accordance with the invention, a connector part is provided which is releasably connectable to the installation unit. An external vacuum can hereby be generated simply and fast as required. A connection to the vacuum pump is established by the connection of the connector part to the installation unit so that an external vacuum can be tapped at the connector part.

Advantageous further developments are described herein.

The connector part is preferably connectable or connected to a suction hose. The other end of the suction hose can be connected to the point at which the external vacuum is to be generated, in particular to an external vacuum container or to an otherwise external container, for example to a wine bottle or to a preserving jar. The external vacuum can in particular also be generated outside the vacuum chamber.

It is advantageous for the connector part to have one or more magnets. The magnet or magnets serves/serve the fastening of the connector part to the installation unit and/or to a side wall of the vacuum chamber.

The installation unit can have a ferromagnetic support part. It is advantageous for the support part to be manufactured from a ferromagnetic material or to comprise a ferromagnetic material. A ferromagnetic material is to be understood in this respect as a material which can be attracted by a magnet. The ferromagnetic material does not have in turn to be magnetic. It is sufficient if it can cooperate force-wise with a magnet. The ferromagnetic material is in particular a material which consists of iron or comprises iron. The support part can serve as a counter-piece to the magnet or magnets of the connector part. The support part can be configured as a sheet metal which is preferably ferromagnetic. It is advantageous if the support part is located at the outer side of the vacuum chamber.

The arrangement can also be made the other way round. It is therefore possible that the support part or another part of the installation part has magnets and that the connector part is ferromagnetic or has a ferromagnetic component.

The installation unit can have a sensor. The sensor can serve the recognition of the fastening of the connector part to the installation unit and thus to the vacuum chamber. The sensor can be provided at the support part and/or at one of the other components of the installation part. It is preferably a reed sensor. The sensor can be in operative connection with the control of the vacuum drawer. The sensor can in particular recognize that an external vacuum is desired. The function "internal vacuum" can hereby be changed int the function "external vacuum" by the control, which can be implemented by software.

It is advantageous for the connector part to have a water barrier. It can be a hydrophilic or hydrophobic water barrier.

The installation unit can instead or additionally have a superfine filter against foreign substances.

The water barrier is preferably formed as a membrane. The membrane can be manufactured from a suitable textile material, in particular Goretex, or from PTFE or from another suitable material.

In accordance with a further advantageous further development, the membrane is clamped in. This preferably takes place by an O ring.

It is advantageous for the membrane to be supported by a support structure. An excessive deformation of the membrane can thereby be prevented in operation. The support structure preferably has fins.

The invention further relates to a connector part for the vacuum pump of a vacuum drawer for vacuuming goods having a vacuum chamber which can be closed in an airtight manner by a cover which can be actuated. The connector part is releasably fastenable and a vacuum pump can be connected to the connector part. The connector part can have the features described as preferable.

The vacuum drawer is expediently suitable for installation within a piece of furniture. The dimension of the vacuum drawer preferably corresponds to possible standard specifications for the dimensioning of such a piece of furniture. The vacuum drawer preferably serves the installation in a kitchen drawer.

The invention accordingly finally relates to a piece of furniture having a built-in vacuum drawer in accordance with the present invention. Both the piece of furniture and the vacuum drawer are consequently characterized by the same advantages and properties such as have already been illustrated. A repetitive description is dispensed with for this reason.

BRIEF DESCRIPTION OF THE DRAWINGS

Further advantages and properties of the invention will be explained in more detail in the following with reference to an embodiment shown in the drawings. There are shown:

FIGS. 1a-1d the vacuum drawer in accordance with the invention from four different perspectives;

DESCRIPTION OF THE PREFERRED EMBODIMENTS

Figure 1A:
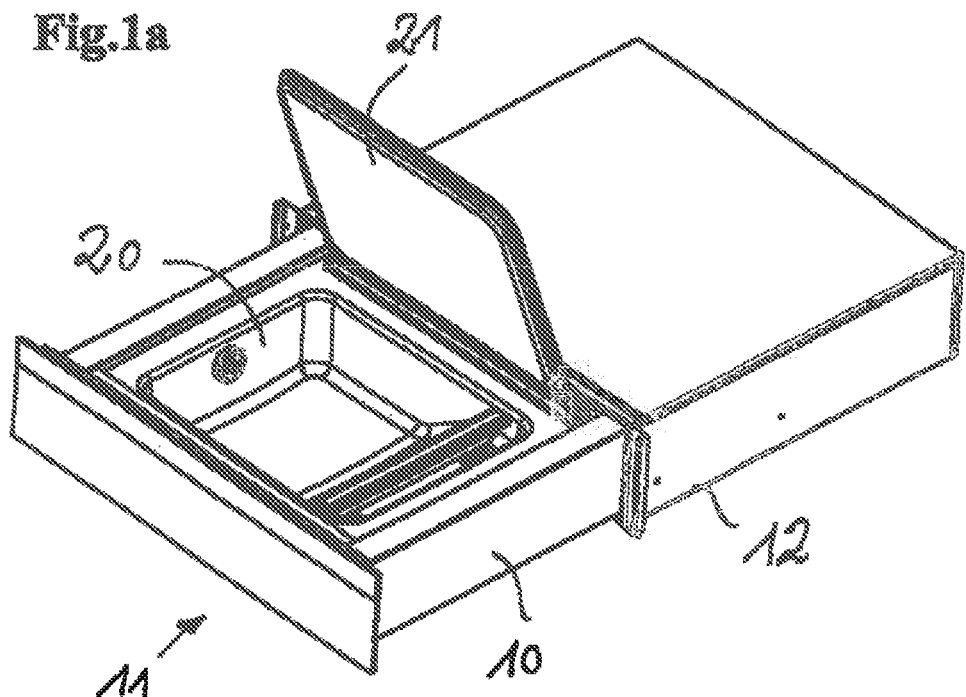
Figure 1B:
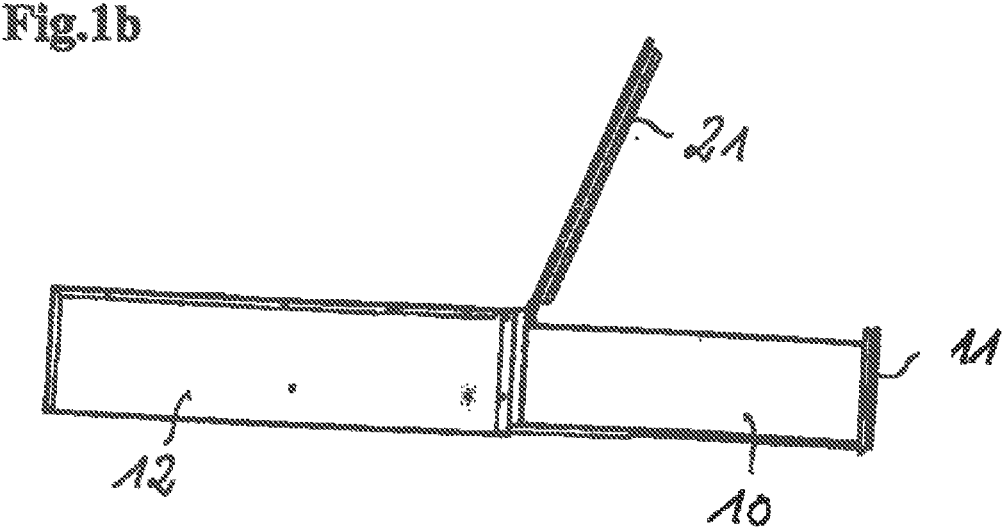

The four FIGS. 1a-1d show the vacuum drawer in accordance with the invention from four different perspectives. FIG. 1a shows a perspective representation from the top right; FIG. 1b corresponds to a side view; FIG. 1c to a plan view; and FIG. 1d to a frontal view. The drawer is suitable for use in a piece of kitchen furniture since it is characterized by an installation height of approximately 140 mm and accordingly corresponds to the standard dimension of fitted kitchens.

The vacuum drawer comprises a drawer extension 10 which is longitudinally displaceably guided over lateral guide rails in a drawer carcass 12. In the embodiment shown, the front cover 11 is handle-less and the drawer extension is designed as a push-pull device for opening and closing. A vacuum chamber 20 is supported within the drawer extension and is fluidically coupled to a vacuum pump of the vacuum drawer to pump the air out of the closed vacuum chamber 20. The vacuum chamber 20 can be closed in an airtight manner via the cover 21 pivotably mounted to the chamber 20. The cover 21 itself can be produced from glass for design reasons.

A sealing bar 22, which extends in the chamber interior in the extension direction of the drawer, serves for the sealing of an inserted bag. A bag filled with food is placed into the chamber 20 for vacuuming and the cover 21 is closed in an airtight manner. The bag can be sealed by means of the sealing bar 22 after the evacuation of the chamber 20 by means of the vacuum pump, not shown. For this purpose, the bag opening to be sealed is placed onto the sealing bar 22 which presses it against a contact point after the vacuuming and seals it by the effect of heat. The bar 22 can be pressed either to a counter-pressing bar 23 fastened to the cover 21 or against an alternative pressing surface.

The vacuum pump is seated behind the chamber 20 at the rear part of the drawer extension 10. The vacuum pump is fluidically coupled to the vacuum chamber 20 and pumps the air out of the chamber 20 to generate the vacuum. Due to the base-side installation of the vacuum pump at the drawer extension 11, the pump is moved along with the chamber 20 on the moving out of the drawer extension 11. The vacuum pump is configured as an oil-lubricated rotary vane vacuum pump.

Figure 2:
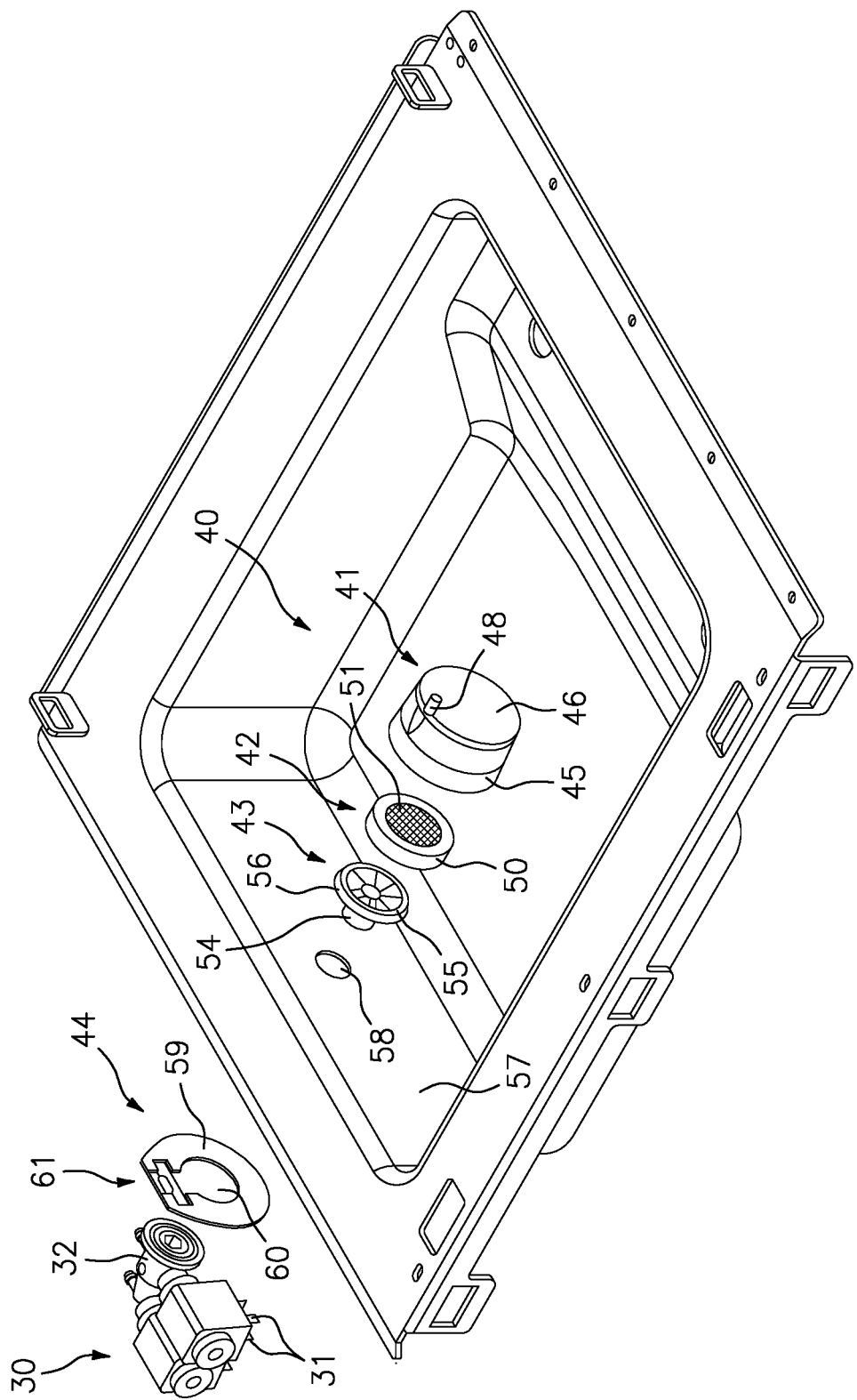
FIG. 2 the vacuum chamber of the vacuum drawer with an installation unit and a connector part in a perspective exploded representation.
Figure 3:
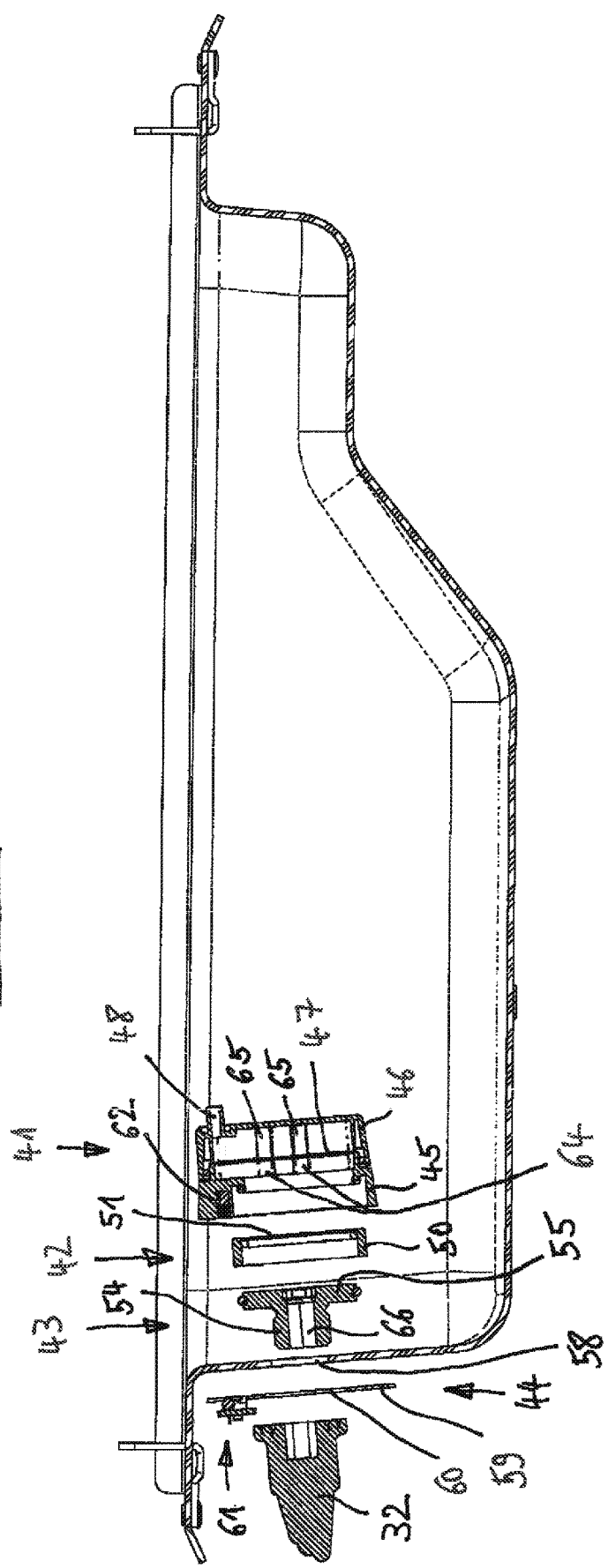
FIG. 3 the vacuum chamber with the installation unit and the connector part in a lateral exploded representation in section.
Figure 4:
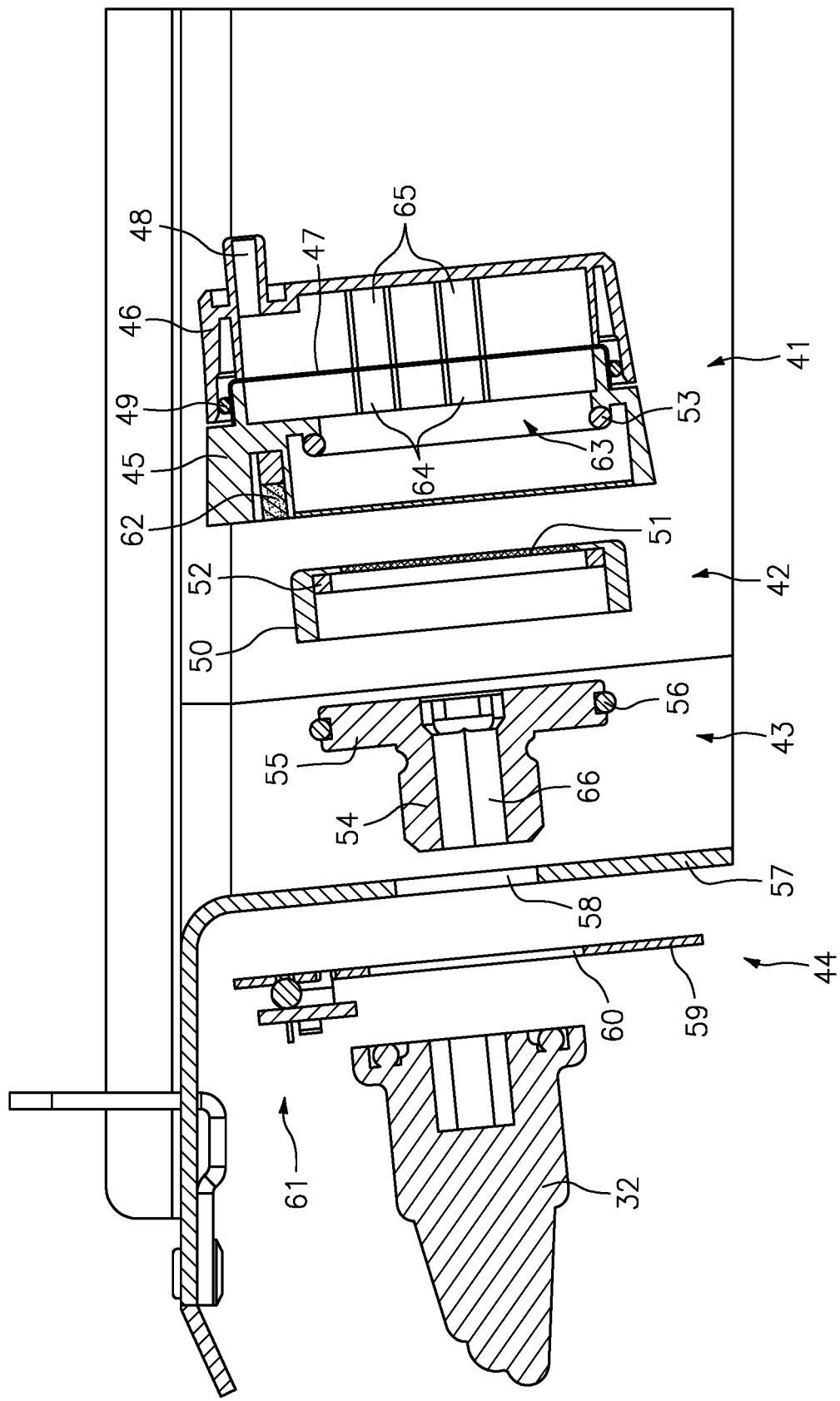
FIG. 4 a detail from FIG. 4 in an enlarged representation.
Figure 5:
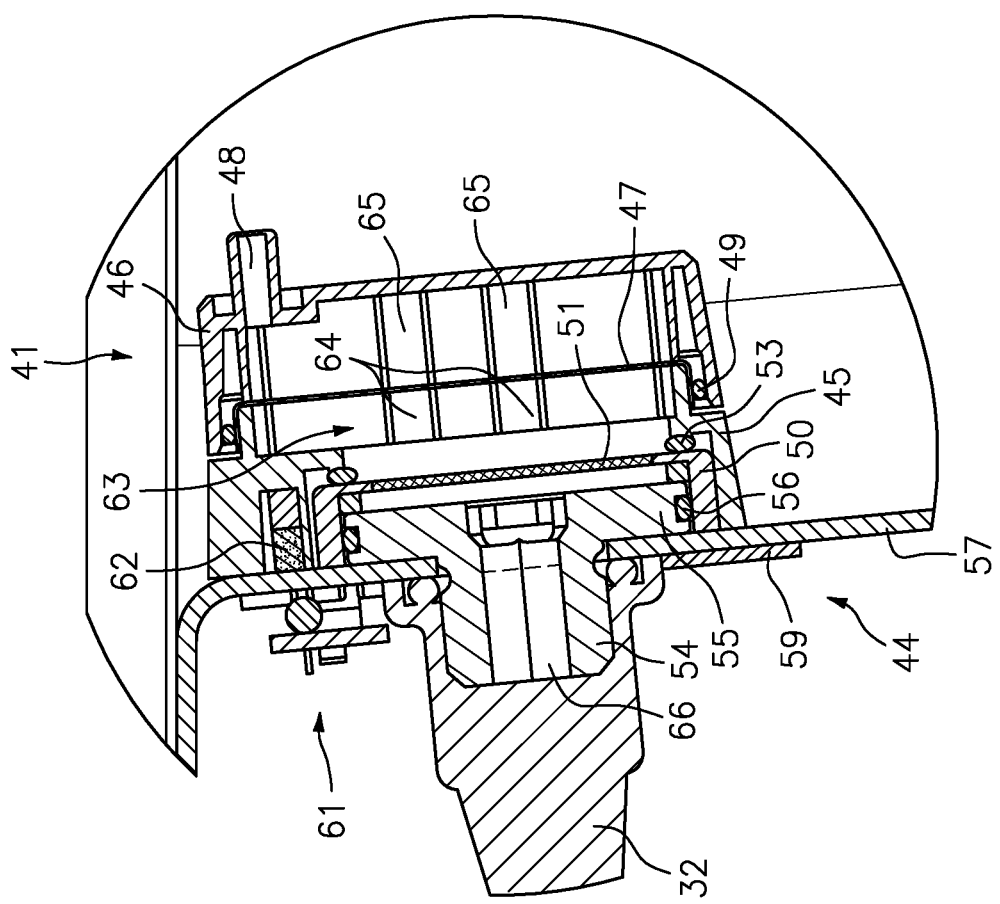
FIG. 5 the installation unit and the connector part in the installed stage.
Figure 6:
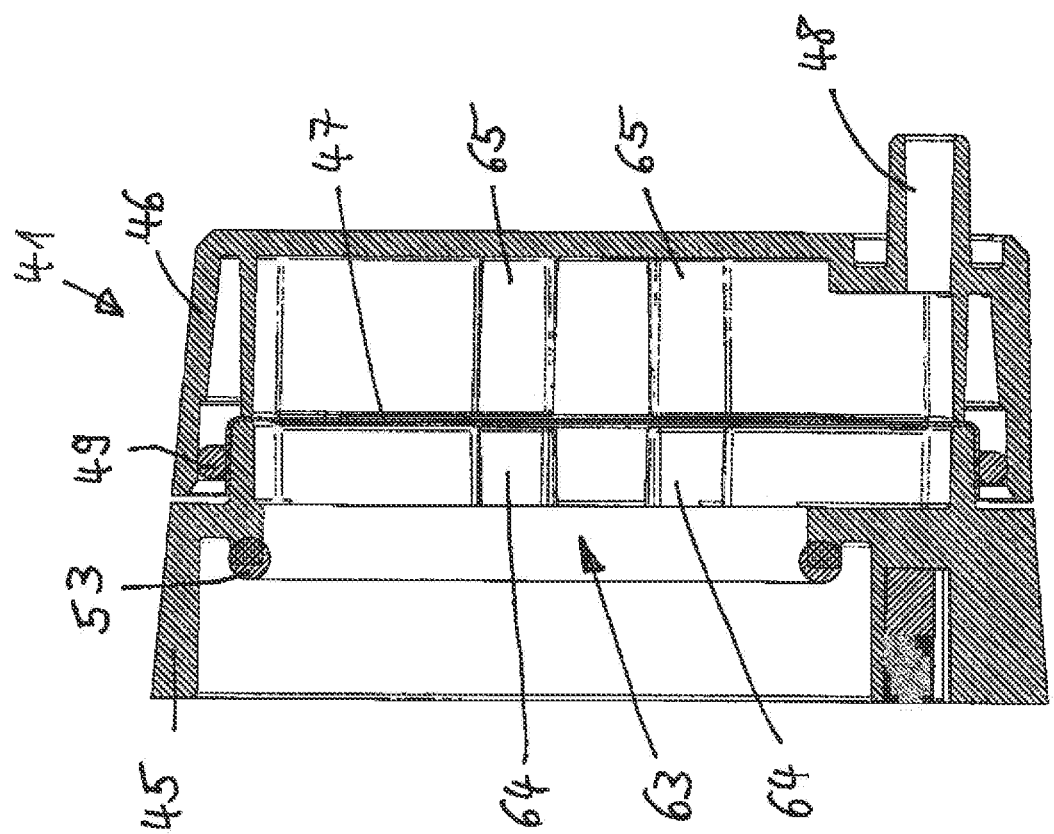
FIG. 6 the connector part in an enlarged sectional representation.
Figure 7:
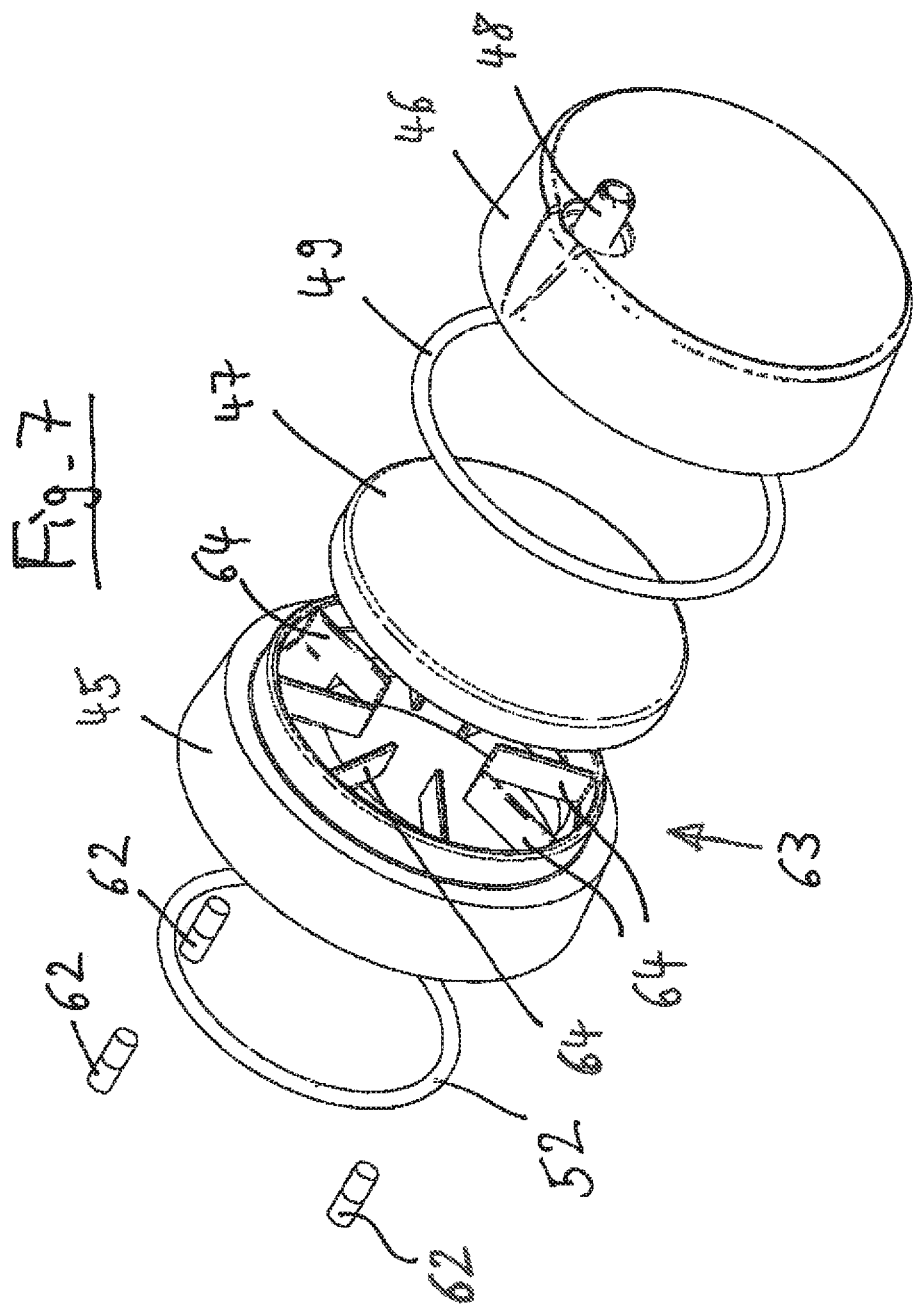
FIG. 7 the connector part shown in FIG. 6 in a perspective exploded representation.

The vacuum drawer comprises an installation unit 40 to which a vacuum pump can be connected, as is in particular shown in FIG. 2. The valve 30 can be connected to a power source by electrical contacts 31. The valve 30 furthermore comprises an intake port 42 whose opening faces the vacuum chamber 20. A vacuum pump (not shown in the drawing) can be connected to the valve 30.

The installation unit 40 comprises a filter part 43, a fastening part 43, a support part 44 and the valve 30. A connector part 41 is releasably connectable to the installation unit 40. The connector part 41 comprises a base part 45, a cover part 46 and a water barrier 47 which is clamped between the base part 45 and the cover part 46. The cover part 46 has an intake port 48 at its side facing the vacuum chamber 20. The water barrier 47 is configured as a membrane. It is clamped in by the O ring 49. A suction hose is connectable or connected, preferably releasably, (not shown in the drawing) to the intake port 48.

The filter part 42 comprises a housing 50 in which a fine screen 51 is fastened. The fine screen 51 is pressed onto a projection of the housing 50 by a pressing ring 52. It comprises a metal braiding. The metal braiding preferably has a mesh size <0.20 mm, further preferably a mesh size <0.10 mm, particularly preferably a mesh size <0.08 mm. The housing 50 of the filter part 42 is sealed with respect to the base part 45 of the connector part 41 in the installed state by a sealing ring 53. The fine screen 51 prevents a penetration of foreign bodies into the valve 30 of the vacuum pump.

The fastening part 43 comprises a fastening section 54 and a contact section 55. It is sealed by a sealing ring 56 with respect to the housing 50 of the filter part 42. The sealing ring 56 is located at the outer periphery of the contact section 55. It contacts the inner periphery of the housing 50 in the installed state.

The installation unit 40 is fastened to a substantially vertical side wall 57 of the vacuum chamber 20. For this purpose, the side wall 57 has an opening 58 whose diameter is larger than the diameter of the fastening section 54 of the fastening part 43. The diameter of the contact section 55 of the fastening part 43 is larger than the opening 58. In the installed state, the contact section 55 contacts the surroundings of the opening 58. The fastening section 54 passes through the opening 58 to the outside. It can be screwed to the intake port 32 of the valve 30 there.

The support part 44 comprises a metal sheet 59 composed of a ferromagnetic material. The metal sheet 59 is substantially planar. It has a central opening 60 whose diameter is larger than the fastening section 54 of the fastening part 43 and is also larger than the end of the intake port 32 of the valve 30 facing the fastening part 43.

The support part 44 furthermore comprises a sensor 61 which is configured as a reed sensor. The sensor 61 is located at the side of the side wall 57 remote from the fastening part 43. It indicates the installed state of the connector part 41.

Magnets 62 are arranged in the base part 45 of the connector part 41. Three magnets 62 are present in the embodiment. They are distributed evenly over the periphery of the base part 45. The magnets 62 are located in recesses on the side of the base part 45 facing the side wall 57. One of the magnets 62 is located in the region of the sensor 61. The magnets 62 have the effect by their cooperation with the metal sheet 59 of the support part 44 that, on the one hand, the connector part 41 is held fast at the side wall 57 of the vacuum chamber 20 in the installed state and that, on the other hand, the sensor 61 indicates the installed state of the connector part 41 at the side wall 57.

The water barrier 47 configured as a membrane is supported by a support structure 63. The support structure 63 is provided in the base part 45 of the connector part 41. It comprises a plurality of fins 64 which are evenly distributed over the periphery of the base part 45. The fins 64 each extend inwardly from the inner side of the outer periphery of the base part 45. They extend over approximately a third of the diameter of the base part 45. Their areal extent extends in the direction of flow, that is in the direction of the longitudinal axis of the connector part 41. The cover part 46 has corresponding counter-fins 65. The membrane which forms the water barrier 47 is clamped between the fins 64 and the counter-fins 65 and is secured against deformation.

In operation, the installation unit 40 is first fastened to the vertical side wall 57 of the vacuum chamber 20. The filter part 42 is then visible for the viewer seen from the vacuum chamber 20. In this state, a vacuum for vacuuming food can be generated in the vacuum drawer. The cover 21 is closed for this purpose. The vacuum pump is subsequently switched on, which can take place automatically by the closing of the cover.

If an external vacuum is to be generated, the connector part 41 can be connected with an open cover 21 to the installation unit 40, that is to the filter part 42. The sensor 61 by which it can be displayed that there is a need for an external vacuum is actuated by the magnets 62. The control of the vacuum drawer is changed from the function "internal vacuum" to the function "external vacuum". The software of the control can in particular recognize via the sensor 61 that an external vacuum is desired.

At the same time, the connector part 41 is fixed to the filter part 42 and thus also to the side wall 57 by its magnets 62 and their cooperation with the ferromagnetic support part 44. An external vacuum is generated at the intake port 48 of the connector part 41 by the vacuum pump. The connector part 41 is additionally held at the filter part 42 and thus also at the side wall 57 by this vacuum. The external vacuum can also be generated at a location further away (now shown in the drawing) by a suction hose which is connected, preferably releasably, to the intake port 48.

The vacuum pump can be switched off by the actuation of a switch (stop switch). The vacuum pump can furthermore switch itself off after reaching a certain vacuum value. When the vacuum pump has been switched off and if an external vacuum is no longer applied, the connector part 41 can be released from the filter part 42 and from the side wall 57 in a simple manner. It only has to be pulled off against the force of the magnets 62. The actuation of the sensor 61 can thereby also be canceled, whereby the control can again be changed to the function "internal vacuum".

During vacuuming, the air flows through the intake port 48, the inner region of the cover part 46, the water barrier 47, the inner region of the base part 45, the fine screen 51, the inner region of the housing 50, and the central opening 66 of the fastening part 43 into the intake port 32 of the valve 30.

The invention claimed is:

1. A vacuum drawer for vacuuming food and having
   a vacuum chamber (20) which can be closed in an airtight manner by a cover (21) which can be actuated,
   a sealing bar (22),
   an installation unit (40) to which a vacuum pump can be connected, the vacuum pump configured to generate an internal vacuum in the vacuum chamber (20), and
   a connector part (41) which is releasably connectable to the installation unit (40), wherein
   the connector part (41) is connected to a suction hose which, to generate an external vacuum in an external vacuum container outside the vacuum chamber (20), is connected to the external vacuum container,
   the connector part (41) comprises
   a base part (45),
   a cover part (46),
   a water barrier (47) clamped between the base part (45) and the cover part (46),
   an intake port (48) through the cover part (46) for connection to the vacuum hose,
   magnets (62) arranged around a periphery of the base part (45), and
   a plurality of fins (64) and counter-fins (65) respectively extending inwardly from inner sides of the base part (45) and the cover part (46), and arranged to clamp the water barrier (47) therebetween.

2. A vacuum drawer for vacuuming food and having
   a vacuum chamber (20) which can be closed in an airtight manner by a cover (21) which can be actuated,
   an installation unit (40) to which a vacuum pump can be connected, and
   a connector part (41) which is releasably connectable to the installation unit (40),
   wherein the installation unit (40) has a support part (44) which is ferromagnetic.

3. A vacuum drawer in accordance with claim 2, wherein the support part (44) is in the form of a substantially planar metal sheet (59) composed of ferromagnetic material and having a central opening (60).

4. A vacuum drawer in accordance with claim 1, wherein the installation unit (40) has a sensor (61).

5. A vacuum drawer in accordance with claim 4, wherein the sensor (61) is arranged at a support part (44).

6. A vacuum drawer in accordance with claim 1, wherein the installation unit (40) has a filter (51) against foreign bodies.

7. A vacuum drawer in accordance with claim 6, additionally comprising
   a housing (50) for the filter (51),
   a first ring (56) arranged to press the filter (51) onto a projection of the housing (50), and
   a second ring (53) arranged to seal the housing (50) against the base part (45) of the connector part (41).

8. A vacuum drawer in accordance with claim 7, wherein the vacuum chamber (20) has an opening (58) through a vertical sidewall (57) thereof,
   the installation unit (40) additionally comprises
   a fastening part (43), in turn, comprising
   a fastening section (54),
   a contact section (55), and
   a sealing ring (56) located at an outer periphery of the contact section (55) and contacting an inner periphery of the housing (50) in an installed state,
   the contact section (55) has a diameter larger than the opening (58) and contacts surroundings of the opening (58) in the installed state, and
   the fastening section (54) is arranged to pass through the opening (58) to the outside.

9. A vacuum drawer in accordance with claim 8, wherein the installation unit (40) has a support part (44) in the form of a substantially planar sheet (59) and having a central opening (60) of a diameter larger than the fastening section (54) of the fastening part (43).

10. A vacuum drawer in accordance with claim 1, wherein the water barrier (47) is configured as a membrane.

11. A piece of furniture, in particular a kitchen drawer, having a built-in vacuum drawer in accordance with claim 1.

12. A connector part (41) for a vacuum pump of a vacuum drawer for vacuuming food having a vacuum chamber (20) which can be closed in an airtight manner by a cover (21) which can be actuated, wherein the vacuum pump is configured to generate an internal vacuum in the vacuum chamber (20), and the connector part (41) is releasably connectable to an installation unit (40) for the vacuum pump and connected to a suction hose which, to generate an external vacuum in an external vacuum container outside the vacuum chamber (20), is connected to the external vacuum container, and the connector part (41) comprises a base part (45), a cover part (46), a water barrier (47) clamped between the base part (45) and the cover part (46), an intake port (48) through the cover part (46) for connection to the vacuum hose, magnets (62) arranged around a periphery of the base part (45), and a plurality of fins (64) and counter-fins (65) respectively extending inwardly from inner sides of the base part (45) and the cover part (46), and arranged to clamp the water barrier (47) therebetween.

\* \* \* \* \*